United States Patent
Meyer et al.

(10) Patent No.: US 6,190,531 B1
(45) Date of Patent: Feb. 20, 2001

(54) CONCENTRATION AND REMOVAL OF TRITIUM AND/OR DEUTERIUM FROM WATER CONTAMINATED WITH TRITIUM AND/OR DEUTERIUM

(75) Inventors: Thomas J. Meyer, Chapel Hill; Poonam M. Narula, Carrboro, both of NC (US)

(73) Assignee: University of North Carolina, Chapel Hill, NC (US)

( * ) Notice: Under 35 U.S.C. 154(b), the term of this patent shall be extended for 0 days.

(21) Appl. No.: 09/361,712

(22) Filed: Jul. 27, 1999

(51) Int. Cl.$^7$ ...................................................... C02F 1/461
(52) U.S. Cl. ........................ 205/742; 205/688; 205/759; 205/760; 588/204
(58) Field of Search .................................. 205/742, 688, 205/759, 760; 588/204

(56) References Cited

U.S. PATENT DOCUMENTS

| 4,054,496 | * 10/1977 | Arrathoon | 204/129 |
| 4,190,515 | 2/1980 | Butler et al. . | |
| 4,228,034 | 10/1980 | Butler et al. . | |
| 4,996,033 | * 2/1991 | Gardner-Chavis et al. | 423/249 |

FOREIGN PATENT DOCUMENTS

| 1 137 025 | 12/1982 | (CA) . |
| 61-0228426 | 2/1986 | (JP) . |
| 8026703 | 1/1996 | (JP) . |

OTHER PUBLICATIONS

B.M. Andreev Et Al., "Isotope Separation Methods for Tritium Removal and Concentration in Nuclear Fuel Cycle," Radiochemistry, vol. 39 (No. 2), p. 95–108, (1997). No Month.

F.A. Cotton Et Al., "Advanced Inorganic Chemistry, A Comprehensive Text," 2nd ed., Interscience Publishers (New York), p. 216–217, (1967). No Month.

R.C. McHatton Et Al., "Electrochemical Behavior of Ru(trpy)(bpy)(OH2)3+ in Aqueous Solution and When Incorporated in Nafion Coatings," vol. 23, Inorg. Chem., p. 3935–3942, (1984). No Month.

J.A. Moss Et Al., "Electropolymerization of Molecular Assemblies," vol. 36, Inorg. Chem., p. 762–763, (1997). No Month.

L. Roecker Et Al., "Hydride Transfer in the Oxidation of Alcohols by [(bpy)2(py)Ru(O)]2+–AkH/kD Kinetic Isotope Effect of 50," vol. 109, J. AM. CHEM. SOC., p. 746–754, (1987). No Month.

Y. Suzuki Et Al., "Separation and Concentration of Hydrogen Isotopes by a Palladium Alloy Membrane," vol. 103, Nuclear Technology, p. 93–100, (1993). No Month.

* cited by examiner

Primary Examiner—Arun S. Phasge
(74) Attorney, Agent, or Firm—Lenkins & Wilson, P.A.

(57) ABSTRACT

Concentration of tritium and/or deuterium that is a contaminant in $H_2O$, followed by separation of the concentrate from the $H_2O$. Employed are certain metal oxo complexes, preferably with a metal from Group VIII. For instance, [Ru$^{IV}$(2,2',6',2"-terpyridine)(2,2'-bipyridine)(O)](ClO$_4$)$_2$ is very suitable.

12 Claims, 1 Drawing Sheet

CONCENTRATION AND REMOVAL OF TRITIUM AND/OR DEUTERIUM FROM WATER CONTAMINATED WITH TRITIUM AND/OR DEUTERIUM

GOVERNMENT INTEREST

Funding was provided by the Environmental Management Science Program, Office of Environmental Management, United States Department of Energy, under Contract No. OR17SP22 3TFW. Therefore, the United States Government has certain rights in the invention.

FIELD OF THE INVENTION

The present invention relates, in general, to concentration of a hydrogen isotope (i.e., tritium and/or deuterium) that is a contaminant in $H_2O$, followed by separation of the concentrate from the $H_2O$. More particularly, the present invention relates to first converting the tritium or deuterium into an organic substrate (and also, some of the $H_2O$ will be converted into the protio form of the organic substrate), followed by electrolysis in the presence of certain metal oxo complexes. This will oxidize the protio form of the organic substrate and produce hydrogen gas and the oxidized form of the organic substrate. Oxidation by the electrolysis of the tritio form of the organic substrate or of the deuterio form of the organic substrate will be negligible, due to differences in the respective rate constants for the respective reactions of the tritio form and deuterio form as compared to the protio form. Consequently, the tritio form of the organic substrate and/or the deuterio form of the organic substrate will be concentrated in the $H_2O$, and can subsequently be removed from the $H_2O$.

| Table of Abbreviations | |
|---|---|
| $PhCH_2OH$ | benzyl alcohol |
| cm | centimeter |
| D | deuterium (also often designated as $^2H$) |
| $D_2O$ | deuterium heavy water (also known as deuterium oxide) |
| HDO | deuteriated light water |
| DPM | disintegrations per minute |
| EtOH | ethyl alcohol |
| g | gram |
| H | hydrogen |
| $H_2$ | hydrogen gas |
| $H_2O_2$ | hydrogen peroxide |
| ITO | indium tin oxide (also known as tin-doped indium oxide namely, $In_2O_3$:Sn) |
| IR | infrared |
| $H_2O$ | light water |
| μA | microampere |
| ml | milliliter |
| mmole | millimole |
| M | molar |
| NHS | N-hydroxy succinimide |
| EDC | 1-(3-dimethylaminopropyl)-3-ethylcarbodiimide hydrochloride |
| Ph | phenyl |
| $H^+$ | proton |
| $k_{obs}$ | pseudo first-order rate constant measured in seconds$^{-1}$ |
| py | pyridine |
| $[Ru^{IV}(bpy)_2(py)(O)]^{2+}$ | $C_{25}H_{16}N_5ORu^{2+}$ |
| $[Ru^{II}(bpy)_2(py)(H_2O)]^{2+}$ | $C_{25}H_{18}N_5ORu^{2+}$ |
| $[Ru^{IV}(tpy)(bpy)(O)]^{2+}$ | $C_{25}H_{14}N_5ORu^{2+}$ |

| -continued | |
|---|---|
| Table of Abbreviations | |
| $[Ru^{III}(tpy)(bpy)(OH)]^{2+}$ | $C_{25}H_{15}N_5ORu^{2+}$ |
| SSCE | saturated sodium chloride electrode |
| HTO | tritiated light water |
| DTO | tritiated heavy water |
| T | tritium (also often designated as $^3H$) |
| $T_2O$ | tritium oxide |
| bpy | 2,2'-bipyridine |
| tpy | 2,2':6',2"-terpyridine |
| V | volt |

BACKGROUND OF THE INVENTION

As discussed by Cotton and Wilkinson, pp. 216–217, *Advanced Inorganic Chemistry* (1967), T is formed continuously in the upper atmosphere of the earth by cosmic ray-induced nuclear reactions. Accordingly, fast neutrons derived from cosmic ray reactions can produce T by the reaction $$^{14}N(n, {}^3H)^{12}C$$

and T is radioactive with a half-life of about 12.4 years. Also, T is made artificially in nuclear reactors, for instance, by the bombardment of lithium with thermal neutrons to form tritium with the emission of alpha particles, according to the formula $$^6Li(n, \alpha)^3H$$

and is commercially available.

As also discussed by Cotton and Wilkinson, D as $D_2O$ is separated from $H_2O$ by fractional distillation or electrolysis and by utilization of very small differences in the free energies of the H and D forms of different compounds. $D_2O$ is commercially available and used as a moderator in nuclear reactors, and also used widely in the study of reaction mechanisms and of spectroscopic mechanisms.

More specifically, as is mentioned in many of the patents cited below, T can be found in nuclear fuel reprocessing plants, waste streams from military operations connected with nuclear weapons programs, and nuclear power reactors that employ $D_2O$ as a moderator and/or coolant. Presently, T is removed from $H_2O$ and $D_2O$ by various gaseous hydrogen separation techniques, such as distillation of $H_2O$, cryogenic distillation of gaseous hydrogen, and the like. Additionally, $T_2O$ can be concentrated from DTO contaminated $D_2O$ by various processes such as vacuum distillation or electrolytic cascade (several stages of water electrolysis), but such processes are of limited use because of the high toxicity of $T_2O$, the low separation factor for distillation, and the high power consumption for the electrolizers. Thus, it is more practical either to convert DTO into the elemental T such as by electrolysis, or to extract T from the water by catalytic exchange with a deuterium stream. Then, the much less toxic elemental T can be enriched by known processes such as cryogenic distillation.

Of interest, each of Canadian Patent No. 1,137,025 issued Dec. 7, 1982 to Dombra, U.S. Pat. No. 4,190,515 issued Feb. 26, 1980 to Butler and Hammerli, and U.S. Pat. No. 4,228,034 issued Oct. 14, 1980 to Butler, Rolston, den Hartog, Molson, and Goodale (all three patents assigned to Atomic Energy of Canada Limited) disclose processes and/or apparatuses for the removal of D and/or T from water.

Also of interest, Japanese Patent No. 61028426 published Feb. 8, 1986 to Masakazu (assigned to Japan Atom Energy Research Institute) discloses a process to concentrate and to recover T as $T_2$ or D as $D_2$ from a gaseous mixture consisting of $H_2$, HT, and $T_2$ or of $H_2$, HD, or $D_2$, respectively, by a system including an isotope separation column and a catalytic reaction column. Additionally, Japanese Patent No. 8026703 published Jan. 30, 1996 to Masaaki (assigned to Permelec Electrode Limited) discloses a process to obtain D by electrolyzing an electrolyte, as water containing D in an electrolytic cell divided into an anode compartment and a cathode compartment, with an ion exchange membrane. According to Masaaki, the process does not cause problems due to explosions from hydrogen and oxygen since they are mixed and recombined into water.

Of background interest with respect to Ru complexes employed in the present invention, McHatton and Anson, "Electrochemical Behavior of $Ru(trpy)(bpy)(OH_2)^{3+}$ in Aqueous Solution and When Incorporated in Nafion Coatings", Vol. 23, *Inorganic Chemistry*, pp. 3935–3942 (1984) describe that polypyridyl complexes of Ru that contain at least one water ligand, when in a Nafion (NAFION 117® is a fluorinated polymer sold by DuPont and having the formula

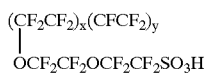

where x and y are the number of repeating monomer units) coating on a graphite electrode can be oxidized to the corresponding oxo complexes of $Ru^{IV}$. Also background, Moss, Argazzi, Bignozzi, and Meyer, "Electropolymerization of Molecular Assemblies", Vol. 36, *Inorganic Chemistry*, pp. 762–763 (1997) describe that electropolymerization of appropriately derivatized metal complexes on conducting substrates leads to electroactive thin films, and one approach was reduction of vinyl-containing polypyridyl complexes such as $Ru(vbpy)_3^{2+}$, where vbpy is 4-methyl-4'-vinyl-2,2'-bipyridine.

Additionally, Roecker (a coworker at the University of North Carolina of one of the inventors (Meyer) of the subject invention) and Meyer had investigated the kinetics and mechanism of the oxidation of a number of alcohol organic substrates by a bipyridine-pyridine ruthenium$^{IV}$ oxo complex, namely $[Ru^{IV}(bpy)_2(py)(O)](ClO_4)_2$ in order to provide $[Ru^{IV}(bpy)_2(py)(O)]^{2+}$, for comparing the protio form of the alcohol organic substrate to the deuterio form of the organic substrate. Their work revealed large, primary deuterium kinetic isotope effects for benzyl alcohol, namely for $PhCH_2OH$ compared to $PhCD_2OH$. See, Roecker and Meyer, "Hydride Transfer in the Oxidation of Alcohols by $[(bpy)_2(py)Ru(O)]^{2+}$. A $k_H/k_D$ Kinetic Isotope Effect of 50", Vol. 109, *Journal of the American Chemical Society*, No. 3, pp. 746–754 (1987).

For instance, Roecker and Meyer found that oxidation of benzyl alcohol (as the organic substrate) by the bipyridine-pyridine ruthenium$^{IV}$ oxo complex, as shown by the equation

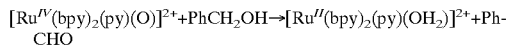

displayed a deuterium kinetic isotope effect that exhibited a ratio of rate constants of $k(C—H)/k(C—D)=50$ while displaying no significant $H_2O/D_2O$ solvent isotope effect.

However, Roecker and Meyer in "Hydride Transfer . . . " failed to recognize any use for their observed kinetic isotope effect with the bipyridine-pyridine ruthenium$^{IV}$ oxo complex. In contrast, the present inventors have surprisingly discovered a method for hydrogen isotope separation by employing ruthenium oxo complexes for concentration and separation of hydrogen isotope contamination from contaminated water.

SUMMARY AND OBJECTS OF THE INVENTION

Thus, the present invention provides a method for separation of hydrogen isotope contamination from water. The method comprises providing an aqueous solution containing hydrogen isotope contamination, and then providing an organic substrate and converting the isotope contamination into the organic substrate in isotope form and converting a portion of the water into the organic substrate in protio form. The method further comprises performing electrolysis, in the presence of a metal oxo complex, on the resultant aqueous solution containing the substrates in order to oxidize the protio form of the organic substrate to its oxidized form and to reduce protons to hydrogen gas. Consequently, the isotope form of the organic substrate is concentrated and is then extracted from the aqueous solution.

Accordingly, it is an object of the invention to incorporate isotopic contamination into an organic substrate for subsequent concentration and removal of isotopic enriched substrate from the contaminated $H_2O$.

It is a further object of the invention to take advantage of the kinetic isotope effect, for when the hydrogen isotope form of a substrate is oxidized versus when the protio form of the substrate is oxidized, in order to remove hydrogen isotope contamination from $H_2O$.

Some of the objects of the invention having been stated above, other objects will become evident as the description proceeds, when taken in connection with the accompanying Laboratory Examples and Drawings as best described below.

DETAILED DESCRIPTION OF THE INVENTION

Figure 1:
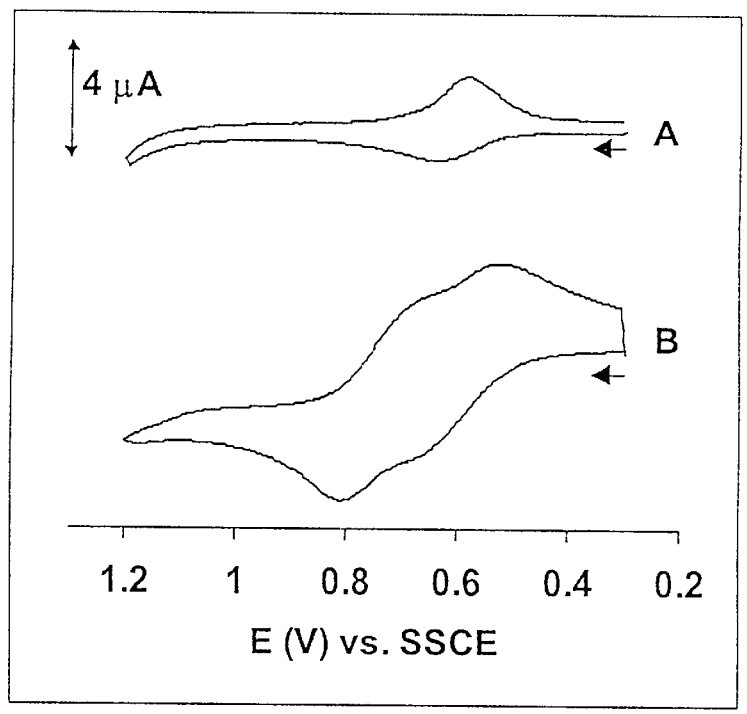
FIG. 1 is a graph where Curve A of the graph represents oxidation of $[Ru(tpy)(bpy)OH_2]^{2+}$ on an ITO elecrode in 0.5 mM $[Ru(tpy)(bpy)H_2O](ClO_4)_2/0.1$ M $NaClO_4$, and Curve B of the graph represents oxidation of $[Ru(tpy)(bpy)OH_2]^{2+}$ by an $ITO/[Ru(tpy)(4',4'-(PO_3H_2)_2bpy)H_2O](ClO_4)_2$ electrode in 0.5 mM $[Ru(tpy)(bpy)H_2O](ClO_4)_2$.

Prior to the above-noted work by Roecker and Meyer in "Hydride Transfer . . . " for the measurement of the deuterium kinetic isotope effect of certain reactions, tritium isotope effects for related reactions had not been measured. Now, the present inventors have measured the deuterium kinetic isotope effect, and under the present inventors' direction, others have measured the tritium kinetic isotope effect, where both measurements are for oxidation of formate (as the organic substrate) to carbon dioxide with a metal oxo complex, for instance, a ruthenium$^{IV}$ oxo complex, such as the $ClO_4^-$ salt of $[Ru^{IV}(tpy)(bpy)(O)]^{2+}$. Accordingly, the present inventors conceived of making use of this kinetic isotope effect for concentration and subsequent removal of hydrogen isotope contamination from water, which is contaminated with one or more hydrogen isotopes.

More specifically, the deuterium kinetic isotope effect was observed by the present inventors (using a procedure essentially the same as that described below in Example III with respect to tritium) to exhibit a ratio of rate constants of $$k(C\text{—}H)/k(C\text{—}D)=26\pm4$$

for when $[Ru^{IV}(tpy)(bpy)(O)]^{2+}$ oxidized formate. On the other hand, repetition of the Roecker and Meyer procedure in "Hydride Transfer . . . ", but instead employing formate for the organic substrate as shown by the equation

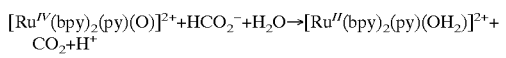
$[Ru^{IV}(bpy)_2(py)(O)]^{2+}+HCO_2^-+H_2O \rightarrow [Ru^{II}(bpy)_2(py)(OH_2)]^{2+}+CO_2+H^+$ displayed a deuterium kinetic isotope effect that exhibited a ratio of rate constants of $$k(C\text{—}H)/k(C\text{—}D)=19\pm3$$

for the deuterium kinetic isotope effect for when $[Ru^{IV}(bpy)_2(py)O]^{2+}$ oxidized formate. Additionally, the value of the rate constant for oxidation of formate by $[Ru^{IV}(tpy)(bpy)(O)]^{2+}$ was observed by the present inventors to be 7.7 $M^{-1}s^{-1}$, which was also comparable to the value of 4.2 $M^{-1}s^{-1}$ previously reported by Roecker and Meyer in "Hydride Transfer . . . " for oxidation of formate by $[Ru^{IV}(bpy)_2(py)(O)]^{2+}$.

More particularly, the now determined tritium kinetic isotope effect, for oxidation of protio-formate as compared to oxidation of tritio-formate by $[Ru^{IV}(tpy)(bpy)(O)]^{2+}$, displayed a ratio of rate constants which was observed to be $$k(C\text{—}H)/k(C\text{—}T)=120\pm4$$

and this surprising result is one of the largest kinetic isotope effects ever measured. As described in more detail below in Example III, the rate constant for reaction of the $Ru^{IV}$ oxo complex with tritio-formate was determined using an excess of the $Ru^{IV}$ oxo complex and tracer levels of tritio-formate.

Additionally, deuterio-formate experiments were performed, as described in more detail below in Example II. More particularly, the extent of reaction was followed by periodically removing an aliquot for IR spectrophotometric analysis (IR purchased from Mattson Instruments, Madison, Wis.) for determination of the fraction of deuterio-formate that had released deuterium to the solvent $H_2O$.

Hence, from the ratio of rate constants, the present inventors made the discovery that hydrogen and deuterium (or hydrogen and tritium), when incorporated into formate, or into other suitable organic substrates, can be nearly completely separated by virtue of the fact that the protio form of the substrate (i.e., protio-formate) is oxidized so much faster than the deuterio form of the substrate or the tritio form of the substrate (i.e., deuterio-formate or tritio-formate).

During oxidation of the organic substrate, the metal oxo complex, for instance $[Ru^{IV}(tpy)(bpy)(O)]^{2+}$, is reduced to the corresponding $Ru^{III}$ complex and then the corresponding $Ru^{II}$ complex, and can be reoxidized to $[Ru^{IV}(tpy)(bpy)(O)]^{2+}$ in an electrochemical process, as illustrated below in Example II with respect to deuterium and employing formate as the organic substrate and using a glassy carbon anode and a platinum cathode. Thus, an electrochemical process is possible in which a metal oxo complex, such as $[Ru^{IV}(tpy)(bpy)(O)]^{2+}$, oxidizes formate to carbon dioxide. The electrolysis is preferably performed at an acidic pH, more preferably a pH from about 6.8 to about 5.0, and even more preferably a pH from about 6.5 to about 5.3. Kinetically controlled preferential oxidation of protio-formate effects a fractionation of the isotopes by leaving deuterio-formate behind in the solvent $H_2O$. The same should be true for leaving tritio-formate behind in the solvent $H_2O$.

It is also contemplated that preferential oxidation of the protio form of an organic substrate over the hydrogen isotope form of the organic substrate may be accomplished with a $Ru^{II}$ oxo complex directly adsorbed onto an electrode, for instance, an ITO electrode or a $TiO_2$ coated ITO electrode, and as described below in Example IV, surface modified electrodes were developed. The electrodes incorporated aqua complexes of $Ru^{II}$ adsorbed on the surface. More specifically, polypyridyl complexes of ruthenium that contain at least one water molecule as a ligand in the coordination environment can be oxidized to the corresponding oxo complexes of $Ru^{IV}$. These oxo complexes adsorbed on the electrode surface should oxidize a variety of organic substrates under catalytic conditions. With ruthenium complexes, the interconversion of redox couples such as $[Ru^{IV}(tpy)(bpy)O]^{2+}/Ru^{III}(tpy)(bpy)OH]^{2+}$ is relatively slow at a typical electrode surface (i.e., an electrode surface that does not have a Ru complex adsorbed onto the surface), and the heterogeneous charge-transfer characteristics depend upon the electrode material, the medium and the conditions in the electrode pretreatment. One of the important factors in the design of molecular-level devices (i.e., monolayer coverage of the ITO surface with the adsorbed Ru complex) is the formation and characterization of redox active molecules on insulating or semiconductor substrates, and the structure of the adsorbed complex of $[Ru^{II}(tpy)(bpy(PO_3H_2)_2)H_2O]^{2+}$ on the surface of an ITO electrode is shown below.

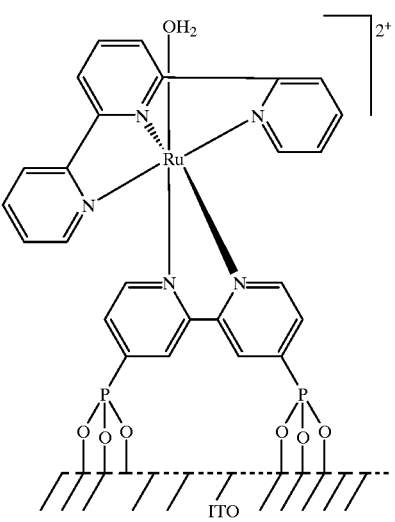

In contrast, two of the earlier attempts at the preparation of such chemically modified electrodes involving ruthenium complexes were $[Ru(tpy)(bpy)H_2O](ClO_4)_2$ incorporated in NAFION 117 coatings on electrode surfaces (as described above regarding McHatton et al.) or $[Ru(tpy)(bpy)H_2O]$ (ClO$_4$)$_2$ electropolymerized in thin polymeric films (as described above regarding Moss et al.), where the coated electrode could serve as a redox catalyst for oxidation of organic substrates. The drawback of the NAFION 117 example was that although the complex exhibited high catalytic activity towards electro-oxidation of benzyl alcohol, the incorporated catalyst was converted into an inactive form after about 150 turnovers.

Kinetic isotope effects of such magnitude as those mentioned above for tritium afford the opportunity of performing isotopic enrichment of selected organic substrates via selective, electrochemical oxidation of the substrate by a metal oxo complex, such as by [Ru$^{IV}$(tpy)(bpy)(O)]$^{2+}$ or by [Ru$^{II}$(tpy)(bpy(PO$_3$H$_2$)$_2$)H$_2$O]$^{2+}$ on an ITO surface or by a related complex of Os, and form the basis for this process to concentrate tritium from H$_2$O that is contaminated with enhanced levels of tritium, with enhanced levels of deuterium, or with enhanced levels of both tritium and deuterium. Hence, on the basis of the observed tritium kinetic isotope effect for oxidation of formate, as illustrated by the equation k(C—H)/k(C—T)=120±4, concentration to nearly 100% of the tritio form of the substrate should be achieved in only a few oxidation-reduction cycles, with the protio form of the substrate being oxidized to its oxidized form. In the case of HCO$_2$$^-$, the oxidized form is CO$_2$.

Electrochemical oxidation of mixed samples of HCO$_2$$^-$/TCO$_2$$^-$, PhCH(CH$_3$)OH/PhCT(CH$_3$)OH, and/or PhCH$_2$OH/PhCHTOH, for instance by employing formate, benzyl alcohol, and/or secondary phenethyl alcohol as a mixture of organic substrates, should be able to be performed to a high degree of substrate consumption (>90%), as shown by the equations

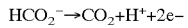

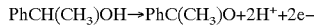

and the unreacted organic substrates will, as a consequence of this kinetic isotope effect, be highly enriched in T (and/or D) with the degree depending on the kinetic isotope effect for oxidation.

While it is not intended to be bound to any theory, it is believed that reduction of an organic substrate (allowing it to incorporate the hydrogen isotope from the H$_2$O) and selective oxidation of the protio component of the organic substrate will allow the majority of the organic couple (such as CO$_2$ and formic acid, benzyl alcohol and benzaldehyde, or secondary phenethyl alcohol and acetophenone) to be reused in a closed oxidation-reduction cycle.

If reduction of the organic substrate in an electrochemical process proves to be uneconomical, for instance, due to too many oxidation-reduction cycles, then electrochemical reduction of the contaminated water (for instance, a mixture of T$_2$O, HTO, D$_2$O, HDO and H$_2$O), preferably under suitable pH conditions, respectively to T$_2$, HT, D$_2$, HD and H$_2$ can be coupled with the oxidation of the Ru$^{IV}$ oxo complex. Incorporation of tritium into the organic substrate would then be accomplished by a hydrogenation process, by standard reactions used in their syntheses, or by electrochemical reduction. For example, the reduction of benzophenone to a derivative of benzyl alcohol could be accomplished with a Pd complex.

It has been demonstrated that CO$_2$ can be converted to formic acid under electrochemical conditions, according to the following equations

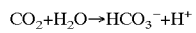

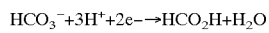

which obviates the need for a separate electrolysis step since tritium can be incorporated directly into tritiated formic acid from the solvent H$_2$O during the reduction step. At the present time, it appears that a standard reduction route using a Pd complex may be a more economically efficient pathway as per the equation

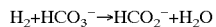

for incorporating tritium into tritiated formate anion (TCO$_2$$^-$) if too many oxidation-reduction closed cycles would be required to convert significantly the tritium contamination in H$_2$O.

It is believed that the incorporation of tritium, deuterium and hydrogen into organic substrates other than carboxylic acids and their salts (for instance, formic acid and its formate salt) can be accomplished using the same methods. Other suitable organic substrates include, but are not limited to, primary and secondary alcohols (for instance, benzyl alcohol or secondary phenethyl alcohol), or unsaturated cyclic carbon compounds (for instance, cyclohexene, ethylbenzene, 3,3,6,6-tetramethyl cyclohexene, or 1,3-cyclohexadiene). However, it is believed tertiary alcohols will not work. (See, Roecker and Meyer, "Hydride Transfer . . . " vis-a-vis tertiary alcohols being unreactive for measurement of the deuterium kinetic isotope effect.)

The hydrogen isotope form of the substrate may then be separated from the system via standard extraction methods and incorporated into a suitable solid polymer matrix for removal from the H$_2$O and then disposal. In the case of formate as the substrate, the enriched product may be recovered by ion-exchange or solvent evaporation to give back the solid salt of the isotopic enriched substrate.

There are primarily three methods that may be employed for incorporation of the tritio form of the substrate into a solid matrix for disposal, described as follows in connection with the preferred embodiment employing formic acid and/or formate anion as the substrate.

If the CO$_2$/formic acid couple is utilized, the chemistry probably will be dictated by the reactivity of the formate anion (or formic acid). The non-lability of the C—H bond of formate (or of the C—T bond of formate) should be preserved in the chosen reactions. (1) The simplest method may be an anion exchange process in which the formic acid reacts with the hydroxy form of a weak base ion exchange resin to sorb to the resin. If the formate salt can be recovered from the H$_2$O as an anhydrous salt, it may be reacted in non-polar solvents with electrophilic polymers containing acid chloride groups to form carboxylic or sulfonic acid esters allowing for storage or disposal of the tritiated polymer. (2) An activated ester of formate (NHS) could be generated using a reagent (EDC) designed to work in the presence of H$_2$O. These activated esters are designed to react with amines, and the NHS ester of tritio-formate could then be reacted with a polymeric amine such as poly(p-aminomethylstyrene) for creation of a solid that is easily filtered from the H$_2$O. (3) The tritium enriched formic acid in water could be heated at reflux with a long chain (water immiscible) alcohol to form the water immiscible ester. The water immiscible formate ester could be partitioned to a hydrocarbon solvent (such as kerosene) to effect removal of the tritiated species from aqueous solution. This last of the three methods has the disadvantage that further reaction would be required to generate a solid, but it may be the least expensive method on the basis of cost of reagents required.

Laboratory Examples

EXAMPLE I

Preparation of terpyridine-bipyridine $Ru^{IV}$ oxo complex

For the concentration of D as further described below in Example II, the metal oxo complex [Ru(tpy)(bpy)(O)](ClO$_4$)$_2$, in order to provide [Ru(tpy)(bpy)(O)]$^{2+}$, was prepared according to the literature method, M. S. Thompson Dissertation Thesis; UNC-Chapel Hill, Chapel Hill, N.C. 27599, in the following manner.

Preparation of [Ru(tpy)(bpy)Cl]Cl 2 g (4.54 mmole) of Ru(tpy)Cl$_3$ and 0.71 g (4.54 mmole) of 2,2'-bipyridine were heated at reflux for 4 hours in 400 ml of 25% EtOH/75% H$_2$O containing 0.2 g (about 25 mmole) LiCl and 1 ml triethylamine as a reductant. The pot contents were filtered hot and their volume (about 100 ml) reduced with a rotary evaporator at which point a precipitate was seen to form. At this point the pot contents were chilled at about 5° C. in a refrigerator for 24 hours.

The solid precipitate was collected on a frit and washed with 2×10 ml portions of chilled 3 M HCl. The solid precipitate was then washed with 30 ml of acetone and 200 ml anhydrous ether, followed by air drying. The precipitated dark brown crystals were not analytically pure. Yield: 1.63 g; 64%. The purification step was as follows.

Preparation of [Ru(tpy)(bpy)Cl]PF$_6$ 0.5 g (0.89 mmole) of the dark brown crystals of [Ru(tpy)(bpy)Cl]Cl was dissolved in 25 ml of absolute ethanol and precipitated as the PF$_6$ salt by adding 2 ml of NH$_4$PF$_6$ saturated ethanol.

The solid precipitate was collected on a frit and washed with 25 ml cold water. This solid precipitate was then dissolved in a minimum amount (about 200 ml) of boiling ethanol and filtered hot. The solution was then placed in a freezer (about −20° C.) for 48 hours. The resulting precipitated black crystals were collected and washed with about 1 ml of cold water. Yield: 0.31 g; 52%.

|  | % C | % H | % N |
|---|---|---|---|
| Calculated: | 44.75 | 2.86 | 10.44 |
| Actual: | 44.62 | 3.17 | 11.04 |

Preparation of [Ru(tpy)(bpy)OH$_2$](ClO$_4$)$_2$ 1.63 g of [Ru(tpy)(bpy)Cl]Cl (2.91 mmole) and 1.21 g of AgClO$_4$ (5.82 mmole) were heated together at reflux for 1 hour in 200 ml of 75% acetone/25% H$_2$O. AgCl was filtered off and the solution volume reduced to 35 ml on a rotary evaporator and chilled at about 5° C. for 24 hours. Brown/black crystals of [Ru(tpy)(bpy)OH$_2$](ClO$_4$)$_2$ were collected on a frit, washed with about 1 ml cold water and then air dried. Yield: 1.85 g; 90%.

|  | % C | % H | % N |
|---|---|---|---|
| Calculated: | 42.44 | 2.99 | 9.90 |
| Actual: | 41.87 | 2.69 | 9.58 |

Preparation of [Ru(tpy)(bpy)O](ClO$_4$)$_2$ 50 mg of [Ru(tpy)(bpy)OH$_2$](ClO$_4$)$_2$ was dissolved in 25 ml of warm (about 50° C.) water. Chlorine gas was bubbled through the solution for 5 minutes, and during this time the solution changed from deep orange to light green. The solution was then purged of chlorine by bubbling through dinitrogen gas and the product precipitated by the addition of 1 ml of NaClO$_4$ saturated water. The solid precipitate was collected on a frit, washed 6 times with a minimum amount of cold water and air dried. Yield: 32 mg; 64%.

|  | % C | % H | % N |
|---|---|---|---|
| Calculated: | 40.37 | 3.10 | 9.42 |
| Actual: | 40.09 | 2.45 | 9.32 |

EXAMPLE II

Concentration of D

Materials and Equipment

The names and locations of the companies from which chemicals were purchased are as follows.

HCO$_2$Na, DCO$_2$Na, Na$_2$SO$_4$, RuCl$_3$·3H$_2$O, 2,2':6',2"-terpyridine, 2,2'-bipyridine, and sodium perchlorate were purchased from Aldrich Chemical Company (Milwaukee, Wis.).

The anode (glassy carbon) was purchased from Electrosynthesis Company and the cathode (platinum) was purchased from Johnson-Mathey (Spokane, Wash.).

The IR spectrometer was purchased from Mattson Instruments (Madison, Wis.).

High purity water was obtained by passing distilled water through a nanopure water purification system purchased from Barnstead Thermolyne (Dubuque, Iowa).

Procedure

This experiment was performed to achieve isotopic separation between H and D. Sodium (protio form) formate and sodium (deuterio form) formate were used as the source of formate ion which is soluble in H$_2$O. More particularly, a mixture of HCO$_2$Na and DCO$_2$Na (i.e., the organic substrates) in a ratio of 4:1 was mixed with aqueous [Ru(tpy)(bpy)(H$_2$O)]$^{2+}$ such that the concentration with the mixture of formates at 10 mM was tenfold in excess of the Ru complex.

Electrolysis was carried out at a glassy carbon working electrode as the anode in the presence of Na$_2$SO$_4$ (Ionic Strength=0.1 M, pH=6.1) as the supporting electrolyte with H$_2$ evolving at a platinum working electrode as the cathode.

[Ru$^{IV}$(tpy)(bpy)(O)]$^{2+}$ was generated electrochemically by holding the potential of the anode at 0.8 V versus SSCE. Once generated, [Ru$^{IV}$(tpy)(bpy)(O)]$^{2+}$ oxidized formate to CO$_2$ as shown by the equation

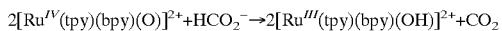

and was regenerated at the anode by oxidation according to the equation

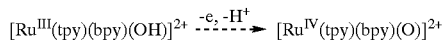

and thus, the net reaction in the cell was

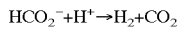

with $H_2$ evolving at the cathode. The $H_2$ did not need to be collected as the amounts were very small and so there was no risk of an explosion hazard. However, standard methods of $H_2$ collection would be employed on a large scale.

The reaction was halted after certain amount of the electrolysis was achieved based on available formates. The respective amounts of unreacted $HCO_2Na$ and $DCO_2Na$ were analyzed by evaporation of the aqueous solution under vacuum at 35° C.

More specifically, the products were analyzed for the fraction of protio-formate and deuterio-formate that had been oxidized by determining the amounts of unreacted $HCO_2Na$ and $DCO_2Na$ in the isotopic mixture using IR spectroscopy. In these measurements, relative peak areas for the $v(C-H)$ and $v(C-D)$ stretching bands at 2834 $cm^{-1}$ and 2134 $cm^{-1}$ were measured in solid state IR spectra in potassium bromide films.

Based on a calibration curve using y=1.28x for the equation of the line where the y-axis was the H/D peak area and the x-axis was the ratio of H/D, then with the following data points as set out below in Table A,

TABLE A

| Calibration Curve Data Points | |
|---|---|
| Ratio of H/D | H/D Peak Area |
| 0.25 | 0.236 |
| 1 | 1.245 |
| 4 | 5.13 |
| 1.5 | 2.03 |
| 0.66 | 0.62 | the ratio of H/D peak areas in the IR spectra was correlated to the ratio of $HCO_2Na/DCO_2Na$ in known mixtures. Thus, the ratio of unreacted H/D in a sample was determined, and the results are set out below in Table B.

TABLE B

| | Ratio of Unreacted H/D | |
|---|---|---|
| D/(H + D) Before Electrolysis | % Electrolyzed Based on the # of Coulombs Passed During Electrolysis | D/(H + D) After Electrolysis |
| 0.41 | 28 | 0.72 |
| 0.41 | 9 | 0.43 |
| 0.2 | 26 | 0.86 |
| 0.57 | 28.7 | 0.80 |
| 0.57 | 58.8 | 0.91 |
| 0.5 | 28 | 0.61 |

These results demonstrate that it is possible to use electrochemical procedures in order to enable preferential oxidation of C—H over C—D in formate to achieve enrichment of the deuterium isotope in a single electrolysis stage.

EXAMPLE III

Determination of T Kinetic Isotope Effect and Concentration of T

Materials and Equipment
1. Tritiated formic acid (from Moravek Biochemicals, Inc., 577 Mercury Lane, Brea, Calif.) in a concentration of 1.0 mCi/mL; 34 ug/ml in 100% water, which the buffer converts to the sodium salt, TCOONa (namely, sodium tritio-formate).
2. Ion exchange membrane solid phase extraction columns and processor (from Supelco, Supelco Park, Belefonte, Pa.):
    a. Column sold under the trade name LC-WCX (carboxylic acid, $Na^+$ counterion), Catalog No. 505595, weak cation exchanger:
       100 mg of sorbent in a 1 ml polypropylene tube fitted with a polyethylene frit with 20 micrometer pores;
    b. Column sold under the trade name LC-SAX (quaternary amine, $Cl^-$ counterion) Cat. No. 57017, strong anion exchanger:
       500 mg of sorbent in a 3 ml polypropylene tube fitted with the same kind of frit having 20 micrometer pores; and
    c. Single solid phase extraction column processor sold under the trade name Visi-1.
3. High point flash liquid scintillation cocktail, sold under the trade name ULTIMA GOLD, Cat. No. 6013324 (from Packard Instrument Co., 800 Research Parkway, Meriden, Conn.).
4. Packard Tri-Carb 2500TR liquid scintillation analyzer (from Packard Instrument Co., 800 Research Parkway, Meriden, Conn.).

Procedure

The reaction was carried out at 25° C. using a constant temperature bath (refrigerated constant temperature circulator, catalog number 914457, sold under the trade name VWR 1165 from Polyscience Division of Preston Industries, Inc., Niles, Ill.) with the reactants in 25 mM phosphate buffer, $(Na_2HPO_4, NaH_2PO_4)/(62.5$ mM $Na_2SO_4)$, (pH=5.65).

The total reaction volume was about 3 ml. The $Ru^{IV}$ oxo complex was prepared freshly by electrochemically oxidizing the $Ru^{II}$ oxo complex, which was synthesized as outlined above in Example I. The $Ru^{IV}$ oxo complex concentration was either 1, 1.5, or 2 mM. Then, 5 nmol of tritiated formic acid was added making for a concentration of about 1.67× $10^{-6}$ M (6.9% of the formic acid was tritiated). The $Na^+$ in the buffer converted the tritiated formic acid into tritio-formate, leaving 93.1% as protio-formate.

At appropriate intervals following the start of the reaction, 10 microliter aliquots of the reaction were withdrawn and each was diluted with the addition of 390 microliters of 18 M-ohm water, as preparation for the subsequent ion exchange procedure. Each 400 microliter sample was poured over the LC-WCX column, and allowed to drain, which was facilitated by the use of a Visi-1 single solid phase extraction column processor to regulate the flow of liquid through the column. Then, the column was washed with an additional 400 microliters of water.

The 800 microliters of total pass through were collected and were poured over the LC-SAX ion exchange column, which was subsequently washed with 1200 microliters of 18 M-ohm water.

The 2 milliliters of total pass through were collected and two samples of 200 microliters each were removed for scintillation counting. Each 200 microliter sample was added to a 20 ml glass scintillation vial containing 9.9 ml of ULTIMA GOLD liquid scintillation cocktail. The samples were then counted using the scintillation analyzer and the appropriate settings for tritium.

The tritium kinetic isotope effect was observed to exhibit a ratio of rate constants of $$k(C—H)/k(C—T)=120\pm4$$

for when $[Ru^{IV}(tpy)(bpy)(O)]^{2+}$ oxidized formate.

Hence, concentration of T, followed by isotopic separation between H and T, may be accomplished in a manner similar to that described above in Example II with respect to D.

EXAMPLE IV $[Ru(tpy)(4,4'-(PO_3H_2)_2bpy)H_2O](ClO_4)_2$ on Surface of ITO Electrode or Surface of $TiO_2$ Coated ITO Electrode Investigated was the electrochemistry of an electrode in water, where the electrode was $[Ru(tpy)(4,4'-(PO_3H_2)_2bpy)(H_2O)](ClO_4)_2$ adsorbed onto the surface of a tin-doped indium oxide electrode by phosphonate binding or onto the surface of this electrode coated with $TiO_2$.

It is believed that this should provide a mechanism for kinetically facile access to the $Ru^{IV/III}$ couple, equivalent to the mechanism described above in Example III, and thus provide another approach to electrocatalytic oxidation of organic substrates. This has been demonstrated for the oxidation of benzyl alcohol by the $ITO/[Ru(tpy)(4,4'-(PO_3H_2)_2bpy)(H_2O)]^{2+}$ electrode and the $ITO/TiO_2/[Ru(tpy)(4,4'-(PO_3H_2)_2bpy)(H_2O)]^{2+}$ electrode.

Surface studies showed that the complex was adsorbed in up to monolayer coverage on ITO surfaces (Curve A of FIG. 1). Moreover, electrochemical data showed that the typically kinetically sluggish oxidation of $Ru^{III}—OH^{2+}$ to $Ru=O^{2+}$ could be induced by cross-surface, proton-coupled electron transfer. Catalysis of this surface reaction was also observed on the coated electrode with submonolayer coverage but where catalytic amounts of $[Ru(tpy)(bpy)H_2O](ClO_4)_2$ were contained in the external aqueous solution (Curve B of FIG. 1).

Figure 2:
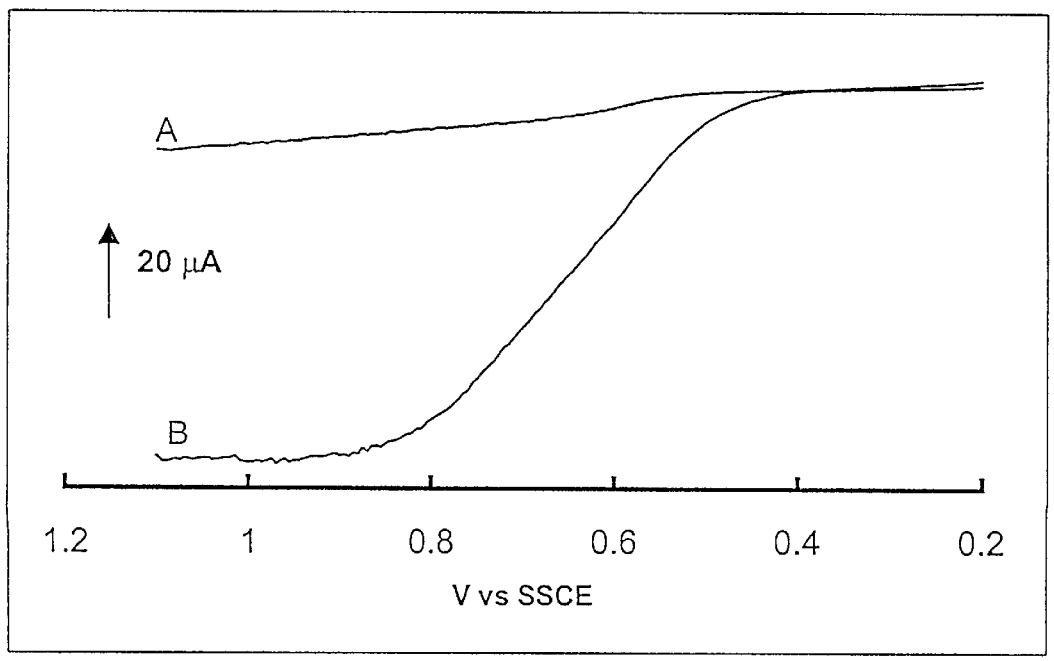
FIG. 2 is a graph where Curve A of the graph represents oxidation of 90 mM benzyl alcohol by an $ITO/[Ru(tpy)(4,4'-(PO_3H_2)_2bpy)H_2O](ClO_4)_2$ electrode in 0.5 mM $[Ru(tpy)(bpy)H_2O](ClO_4)_2$, and Curve B of the graph represents oxidation of 90 ml of benzyl alcohol by an $ITO/TiO_2/[Ru(tpy)(4,4'-(PO_3H_2)_2bpy)H_2O](ClO_4)_2$ electrode in 0.5 mM $[Ru(tpy)(bpy)H_2O](ClO_4)_2$.

More particularly, Curve B of FIG. 1 shows a cyclic voltammogram of the oxidation of an ITO electrode coated with $[Ru(tpy)(4,4'-(PO_3H_2)_2bpy)H_2O](ClO_4)_2$ in the presence of catalytic amounts of $[Ru(tpy)(bpy)H_2O](ClO_4)_2$ in the external solution. The catalysis of $Ru^{III}$ to $Ru^{IV}$ oxidation can be clearly shown by the appearance of the pronounced redox wave at 0.8 V vs SSCE. Curve A of FIG. 2 illustrates the application of this $ITO/[Ru(tpy)(4,4'-(PO_3H_2)_2bpy)(H_2O)]^{2+}$ electrode to the oxidation of benzyl alcohol in solution. Also, as shown by Curve B of FIG. 2, a related effect was observed on nanoparticle thin $TiO_2$ film for a $ITO/TiO_2/[Ru(tpy)(4,4'-(PO_3H_2)_2bpy)(H_2O)]^{2+}$ electrode with a $TiO_2$ film thickness of approximately 2 micrometers. Specifically, Curve B of FIG. 2 shows linear sweep voltammograms of benzyl alcohol oxidation on $ITO/TiO_2$ with saturated surface coverage of $[Ru(tpy)(4,4'-(PO_3H_2)_2bpy)H_2O](ClO_4)_2$. This experiment as per Curve B of FIG. 2 demonstrated that the surface catalytic effect also exists in these high internal surface area semiconductor thin $TiO_2$ films and demonstrated the advantage of the larger effective surface area of the derivatized $TiO_2$ films.

Thus, preferential oxidation of the protio form of an organic substrate over the hydrogen isotope form of the organic substrate may be accomplished with a $Ru^{II}$ oxo complex directly adsorbed onto an electrode for instance, an ITO electrode or a $TiO_2$ coated ITO electrode.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for separation of hydrogen isotope contamination from water comprising:
    (a) providing an aqueous solution containing hydrogen isotope contamination;
    (b) providing an organic substrate and converting
        (i) the isotope contamination into the organic substrate in isotope form and
        (ii) a portion of the water into the organic substrate in protio form;
    (c) performing electrolysis in the presence of a metal oxo complex on the aqueous solution resultant from (b) in order to oxidize the protio form of the organic substrate into its oxidized form and hydrogen gas and to concentrate the isotope form of the organic substrate; and
    (d) extracting the isotope form of the organic substrate from the aqueous solution resultant from (c).

2. The method of claim 1, wherein the hydrogen isotope contamination is selected from the group consisting of $T_2O$, HTO, $D_2O$, HDO, DTO, and combinations thereof.

3. The method of claim 1, wherein the provided organic substrate is selected from the group consisting of carboxylic acids and their salts, unsaturated cyclic carbon compounds, primary alcohols, secondary alcohols, and combinations thereof.

4. The method of claim 1, where the provided organic substrate is selected from the group consisting of formate, benzyl alcohol, phenethyl alcohol, 1-cyclohexene, ethylbenzene, 3,3,6,6-tetramethyl cyclohexene, benzaldehyde, 1,3-cyclohexadiene, and combinations thereof.

5. The method of claim 1, wherein the metal oxo complex is selected from Ru oxo complex, Os oxo complex, and combinations thereof.

6. The method of claim 5, where the metal oxo complex is a Ru oxo complex.

7. The method of claim 6, wherein the Ru oxo complex is $[Ru^{IV}(2,2',6',2''-terpyridine)(2,2'-bipyridine)(O)](ClO_4)_2$.

8. The method of claim 6, wherein the Ru oxo complex is $[Ru^{IV}(bpy)_2(py)(O)](ClO_4)_2$.

9. The method of claim 6, wherein the Ru oxo complex is adsorbed directly onto an electrode.

10. The method of claim 9, wherein the Ru oxo complex is $[Ru(tpy)(4,4'-(PO_3H_2)_2bpy)(H_2O)](ClO_4)_2$.

11. The method of claim 10, wherein the electrode is selected from the group consisting of indium tin oxide and indium tin oxide coated with titanium dioxide.

12. The method of claim 1, wherein the electrolysis is performed at an acidic pH.

* * * * *

UNITED STATES PATENT AND TRADEMARK OFFICE
CERTIFICATE OF CORRECTION

PATENT NO. : 6,190,531 B1  
DATED : February 20, 2001  
INVENTOR(S) : Thomas J. Meyer and Poonam M. Narula It is certified that error appears in the above-identified patent and that said Letters Patent is hereby corrected as shown below:

<u>Column 1,</u>
Lines 6-12, please delete the following:

-- GOVERNMENT INTEREST  
Funding was provided by the Environmental Management Science Program, Office of Enviromental Management, United States Department of Energy, under Contract No. OR17SP22 3TFW. Therefore, the United States Government has certain rights in the invention. --

Signed and Sealed this

Twenty-fourth Day of June, 2003

JAMES E. ROGAN  
*Director of the United States Patent and Trademark Office*